Feb. 14, 1956 W. E. BOYLAN ET AL 2,734,752
HAND LIFT TRUCK
Filed June 28, 1950 3 Sheets-Sheet 1
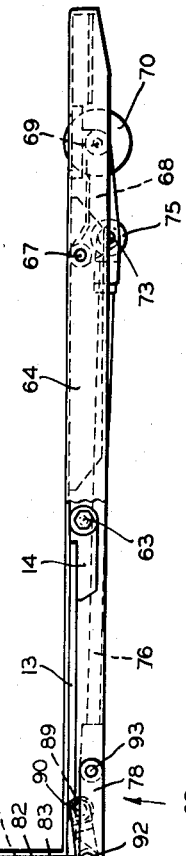
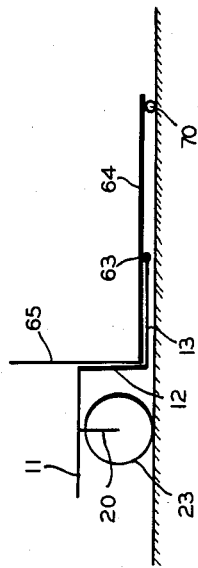
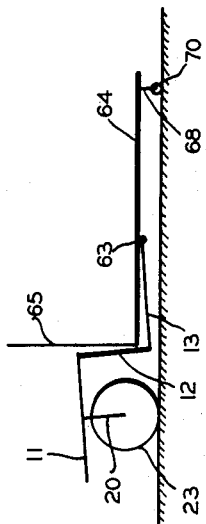
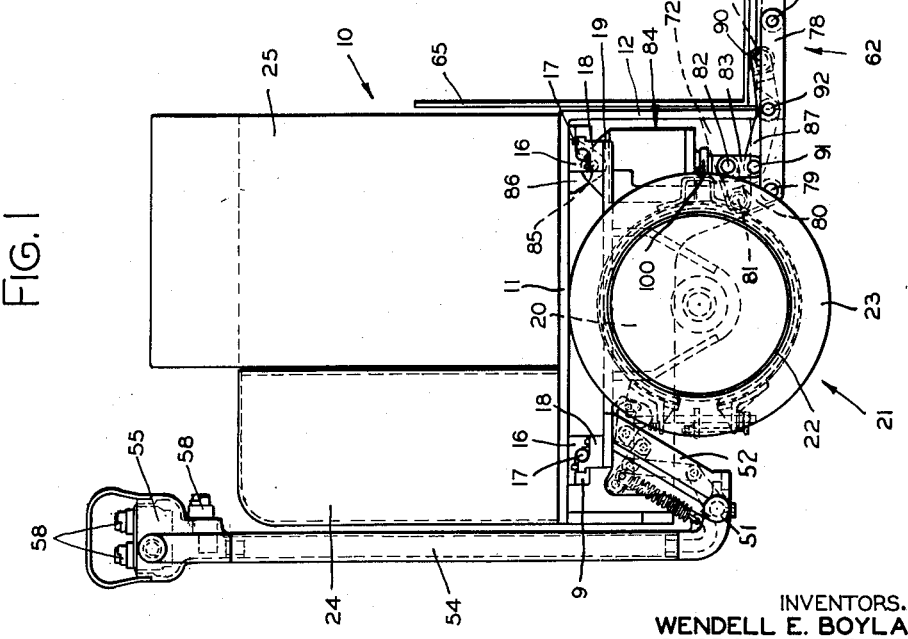
INVENTORS.
WENDELL E. BOYLAN
GEORGE L. TURNER
BY
ATTYS.

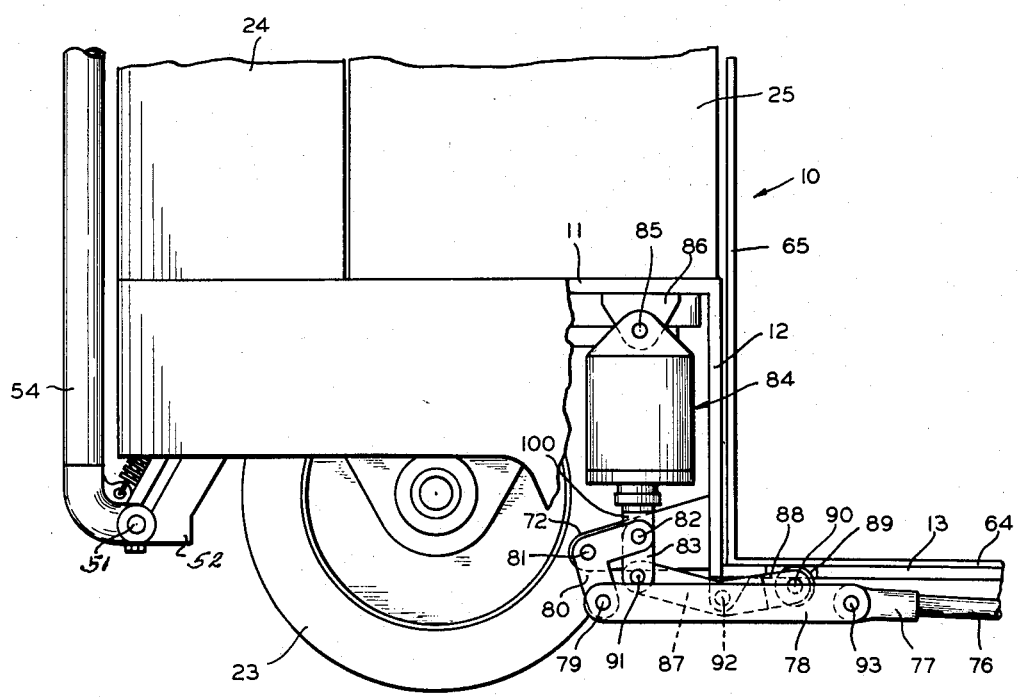

Feb. 14, 1956  W. E. BOYLAN ET AL  2,734,752
HAND LIFT TRUCK
Filed June 28, 1950  3 Sheets-Sheet 3
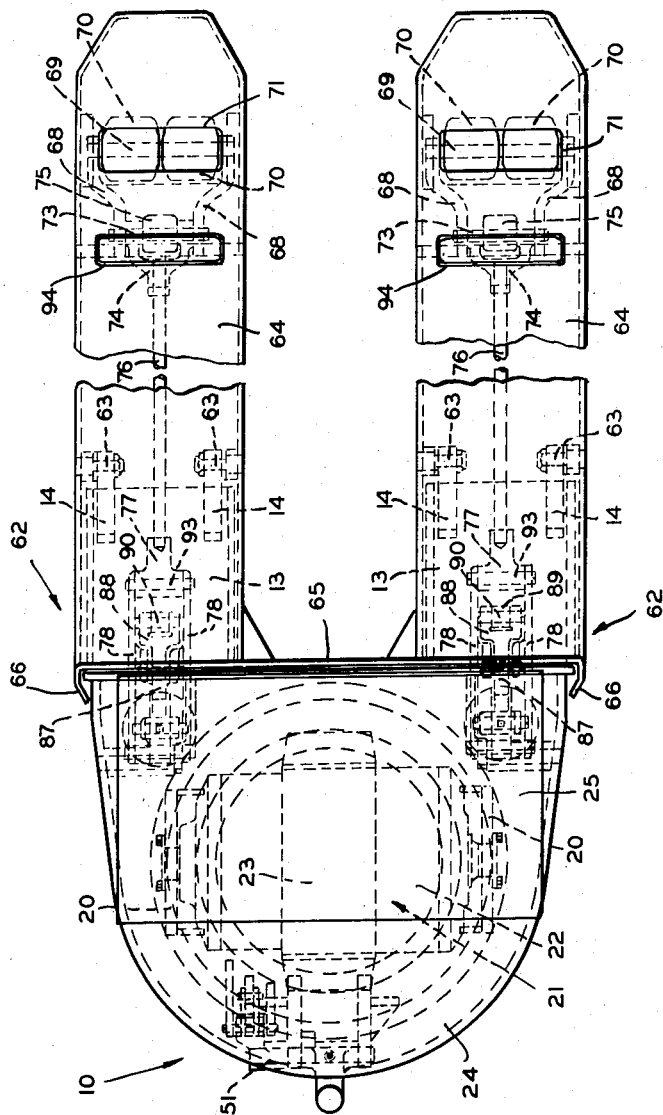
INVENTORS.
WENDELL E. BOYLAN
GEORGE L. TURNER
BY
ATTYS.

United States Patent Office 2,734,752
Patented Feb. 14, 1956

2,734,752

HAND LIFT TRUCK

Wendell E. Boylan and George L. Turner, Buchanan, Mich., assignors to Clark Equipment Company, Buchanan, Mich., a corporation of Michigan Application June 28, 1950, Serial No. 170,828

2 Claims. (Cl. 280—44)

Our invention relates generally to lift trucks, and, more specifically, is directed to self-propelled hand operated lift trucks for transporting pallet supported loads.

One form of hand operated lift truck known in the art comprises a main frame which is supported by a wheel unit. Disposed forwardly of the main frame is a load supporting means which is supported at its forward end by means of extensible wheel assemblies. The load supporting means is mounted, for vertical movement, on the main frame by means of vertical slides and roller members, respectively mounted to the main frame and load supporting means. Vertical movement of the load supporting means, with respect to the main frame, is effected by means of load elevating means, as, for example, one or more hydraulic piston and cylinder assemblies disposed forwardly of the main frame. The hydraulic piston and cylinder assemblies are operatively connected, through suitable linkage means, to the extensible wheel assemblies for extending and retracting the latter and thereby elevating and lowering the load supporting means which, as aforedescribed, is guided on the main frame by means of the vertical slides and roller members. The longitudinal length of the hand truck is made up of the main frame, slides and rollers, load elevating means, and load supporting means.

It is a primary object of our present invention to provide a hand lift truck having a minimum longitudinal extent.

It is another object of our invention to provide guide means between the main frame and load supporting means of a hand lift truck, which guide means has a minimum longitudinal extent and is of simple and economical construction.

We contemplate, in order to achieve the aforesaid objects, the provision of a hand lift truck comprising a main frame, including a first vertical plate member extending transversely thereof, and load supporting means, including a second vertical plate member extending transversely thereof, disposed forwardly of the main frame. The specific form of load supporting means shown in the present application is fully described and claimed in the copending application of Elliot, Lapsley, and Turner, Serial No. 172,576, filed July 7, 1950, now Patent No. 2,623,756, granted December 30, 1952. It will be understood that other forms of load supporting means may be incorporated with the hand lift truck of our present invention. Formed integrally with the vertical edges of the second plate member are a pair of flange members which are disposed about the vertical edges of the first plate member for guiding the load supporting means on the main frame during relative vertical movement therebetween. The main frame is supported on a wheel unit, and the forward end of the load supporting means is supported on a pair of extensible wheel assemblies which are extended and retracted through suitable linkage means, preferably actuated by means of a pair of hydraulic piston and cylinder assemblies carried by the main frame, rearwardly of the first plate member, adjacent each side of the wheel unit. It will be observed that the longitudinal extent of the truck has been reduced to a minimum, as the longitudinal length is now made up of only the main frame, the pair of plate members, and the load supporting means. Obviously, the plate members occupy less space than comparable slide and roller assemblies of the prior art. Furthermore, it will be noted that the hydraulic piston and cylinder assemblies occupy no additional longitudinal space than that already required by the wheel unit.

A feature of our invention is the reduction, to a minimum, of the distance between the main wheel unit and an axis passing through the wheel assemblies which permits the weight of a load, carried by the load supporting means, to be better distributed over the length of the hand lift truck.

It is a still further object of our present invention to provide a hand lift truck, of the character described, which is of sturdy construction and light in weight, and which is efficient in operation and economical to manufacture.

Now, in order to acquaint those skilled in the art with the manner of constructing and using the devices of our present invention, we shall describe in connection with the accompanying drawings a preferred embodiment of our invention.

In the drawings:

Figure 1 is a side elevation view of the hand truck of our present invention with portions being broken away for sake of clarity;

Figure 1A is a fragmentary side elevational view of the hand truck of Figure 1, but on a larger scale and in solid lines;

Figure 2 is a plan view of the hand truck of Figure 1;

Figure 3 is a diagrammatic view of the hand truck of Figure 1, with the load supporting means in a normal position; and Figure 4 is a diagrammatic view of the hand truck of Figure 1, with the load supporting means in an elevated position.

Referring now to Figures 1 and 2, there is shown a hand truck, indicated generally by the reference numeral 10, having a horizontally extending main frame 11, to which, at the forward edge thereof, is secured the upper edge of a vertically downwardly extending plate member 12. Secured to the vertical plate member 12 and projecting forwardly therefrom, adjacent each side thereof, are a pair of load supporting frames 13. Each of the load supporting frames 13 is provided with a pair of horizontally spaced apart bracket members 14 suitably secured, as by welding, to the lower edge thereof. A pair of housing members 24 and 25 are mounted on the main frame 11 and are respectively provided for enclosing the hydraulic fluid system which controls the load elevating mechanism, to be described hereinafter, and the batteries (not shown) which supply power to the electric motor, to be described hereinafter.

Secured to the underside of the horizontal main frame 11 is a race member 16 which is supported upon a plurality of ball members 17 carried by a lower race member 18. A retaining ring 9 is secured to the underside of the race member 16 and cooperates with an annular flange extending radially from the race member 18 for positioning the latter relative to the race member 16. The lower race member 18 is secured to a rotatable horizontally extending ring member 19, to which, at each side thereof, is secured a depending plate member 20. Rotatably mounted within the depending plate members 20, intermediate thereof, is a motor-in-wheel construction, indicated generally by the reference numeral 21, which is fully described in the copending application of Hawkins, Lapsley, and Turner, Serial No. 175,376, filed July 22, 1950, now Patent No. 2,608,598, granted August 26, 1952.

The motor-in-wheel construction 21 comprises an electric motor casing 22 upon which is mounted, for rotation therewith, a tire 23. The horizontal rotatable ring member 19, the depending plate members 20, and the motor-in-wheel construction 21, are adapted to rotate as a unit about a vertical axis and thus the motor-in-wheel construction 21 may be utilized both for powering and steering the hand truck of our present invention.

A shaft 51 is rotatably supported within a pair of vertically extending and laterally spaced apart plate members 52 which are suitably secured to the rotatable frame 19 of the hand truck 10. Mounted on the shaft 51 between the plate members 52 is the lower end of a tubular steering handle 54. Mounted to the upper end of the steering handle 54, as shown in Figure 1, is a steering head 55 which, has conveniently disposed thereabout a plurality of operating buttons 58 which are adapted to be manipulated for starting and stopping the truck 10, and for operating the various hydraulic devices associated therewith. Control lines, connecting the operating buttons 58 with the various hereinafter described hydraulic devices and the prime mover of the truck 10, are disposed within the tubular steering handle 54.

Pivotally mounted, intermediate of their ends, by bolts 63, to the outer ends of the bracket members 14, secured to the lower edge of the horizontal frame members 13, are a pair of forwardly projecting fork frames 64 which are formed with aprons around their outer edges. Interconnecting the inner ends of the fork frames 64 is a transverse vertically extending plate member 65 which has flange members 66 formed integrally along each vertical edge, which flange members are adapted to be disposed or wrapped around the vertical edges of the plate member 12 carried by the main frame 11 of the hand truck 10.

Disposed adjacent each side of the hand truck 10 is a load elevating mechanism, indicated generally by the reference numeral 62, which is adapted to cooperate with each of the fork frames 64. Since both of the load elevating mechanisms 62 are of the same construction, and operate in the same manner, it is believed that a description of one will be sufficient for purposes of the present disclosure.

Pivotally mounted to a shaft 67, secured at its ends within the apron of the fork frame 64, adjacent the forward end thereof, is a pair of spaced bracket members 68 which, at their outer ends, are spread laterally. Journaled in the outer ends of the bracket members 68 is a shaft 69 upon which is mounted a pair of rollers 70. When the bracket members 68 are rotated clockwise about the shaft 67 the rollers 70 are forced downwardly, which provides a reaction point for forcing the fork frames 64 upwardly. A transverse slot 71 is provided in the upper surface of the fork frame 64 on receiving the upper peripheries of the roller members 70 when the fork frame 64 is in a nonelevated position. A second transverse slot 94 is provided in the upper surface of the fork frame 64 for receiving the one ends of the brackets 68.

Mounted, adjacent its ends, to the bracket members 68 is a shaft 73 upon which is pivotally mounted the ends of a fork member 74. Rotatably mounted on the shaft 73, between the ends of the fork member 74, is a roller member 75. The fork member 74 is suitably secured to the one end of a draw rod 76, which draw rod 76, at its other end, is secured to a T-shaped member 77. Pivotally mounted, by a pin member 93, to the ends of the T-shaped member 77 are a pair of parallel links 78 which, at their other ends, are pivotally mounted, as by a pin member 79, to the one leg of a bell crank 80. The bell crank 80 is pivotally mounted about a fixed shaft 81 carried by brackets 72 secured to the rear surface of the plate member 12. The other leg of the bell crank 80 is pivotally mounted, as by a pin member 82, to the lower end of a piston rod 100 of a hydraulic piston and cylinder assembly, indicated generally by the reference numeral 84, which hydraulic assembly 84 at its upper closed end is pivotally mounted, by a pin member 85, to a vertical flange member 86 secured to the lower surface of the main frame 11 of the hand truck 10.

Pivotally mounted to the vertical plate member 12 is a bell crank 87 which, at its forward end, is provided with a fork member 88, between the legs of which extends a shaft 90 upon which is rotatably mounted a roller 89. The roller 89 is adapted to extend through a slot formed in the frame member 13 so as to engage the lower surface of the fork frame 64. The other end of the bell crank 87 is pivotally mounted, by a pin 91, to the lower end of a connecting link 83, pivotally mounted at its upper end about pin 82 to the piston rod 100. The hydraulic piston and cylinder assemblies are connected through suitable fluid lines (not shown) to a conventional fluid pump (not shown) carried by the main frame 11.

When fluid under pressure is admitted to the upper end of the hydraulic piston and cylinder assembly 84, the piston rod 100 and connecting link 83 are extended causing the bell crank 80 to rotate clockwise about the pin 81 and the bell crank 87 to rotate counterclockwise about the pin member 92. Counterclockwise rotation of the bell crank 87 urges the inner end of fork frame 64 upwardly. Clockwise rotation of the bell crank 80 causes the link members 78 to pull the draw rod 76 to the left, as viewed in Figure 1, thereby causing the bracket members 68 to be rotated clockwise about the shaft 67 which urges the outer ends of the fork frames 64 upwardly. Therefore, it will be realized that the fork frames 64 are raised adjacent their inner ends by means of the bell cranks 87 and at their outer ends by means of the bracket members 68 and the rollers 70.

When the fork frames 64 are in their nonelevated position the main frame 11 and the fork frames 64 assume the position shown in Figure 3. Upon admission of fluid under pressure to the hydraulic piston and cylinder assemblies 84, the inner and outer ends of the fork frames 64 are raised simultaneously to the position shown in Figure 4, and the main frame 11, plate member 12, and frame 13 are rotated counterclockwise with respect to the fork frames 64 about the pin members 63 until they assume the position shown in Figure 4.

When fluid under pressure is bled from the hydraulic piston and cylinder assembly 84 the piston rod 100 and connecting link 83 are caused to move upwardly, thereby rotating the bell crank 80 counterclockwise about pin member 81 and the bell crank 87 clockwise about pin member 92. This movement of the bell cranks 80 and 87 lowers the fork frames 64.

It will be noted that the hydraulic piston and cylinder assemblies 84, which are utilized for actuating the elevating mechanisms of the fork frames 64, are disposed below the main frame 11, rearwardly of the vertical transverse plate member 65 which comprises part of the load supporting means of our present invention. By disposing the hydraulic piston and cylinder assemblies 84 rearwardly of the plate member 64, adjacent each side thereof, the main support wheel 23 is permitted to be disposed closely adjacent the load supporting means, and thus the weight of a load supported on the fork frames 64 is distributed better throughout the length of the truck.

While we have shown and described what we believe to be a preferred embodiment of our invention, it will be understood that various modifications and rearrangements may be made therein without departing from the spirit and scope of our present invention.

We claim:

1. In a hand lift truck, the combination of a main frame including a horizontal platform portion, a wheel unit immediately below said horizontal platform portion, means for mounting said wheel unit to said horizontal platform portion for rotation about a vertical axis, load supporting means disposed forwardly of said main frame, said load supporting means including a pair of horizontal forwardly extending fork frames, linkage means having connection with said fork frames for elevating the latter, a pair of vertically extending hydraulic piston and cylinder assemblies carried by said main frame below said horizontal platform portion and having direct connection with said linkage means for operating the latter, and said hydraulic piston and cylinder assemblies being arranged at each side of the truck.

2. In a hand lift truck, the combination of a main frame including a horizontal platform portion, a wheel unit immediately below said horizontal platform portion, means for mounting said wheel unit to said horizontal platform portion for rotation about a vertical axis, said wheel unit including a drive wheel rotatable on a horizontal axis, load supporting means disposed forwardly of said main frame, said load supporting means including a pair of horizontal forwardly extending fork frames, linkage means between said main frame and said fork frames for elevating the latter, a pair of vertically extending hydraulic piston and cylinder assemblies carried by said main frame below said horizontal platform portion and having direct connection with said linkage means for effecting operation of the latter, and said hydraulic piston and cylinder assemblies being arranged at each side of the truck so that a vertical transverse plane passing through the axes of the latter is substantially tangent to said drive wheel.

References Cited in the file of this patent

UNITED STATES PATENTS

| | | |
|---|---|---|
| 1,340,418 | Schneider | May 18, 1920 |
| 1,625,421 | Pearl | Apr. 19, 1927 |
| 1,884,281 | Schibrowski | Oct. 25, 1932 |
| 2,372,585 | Klumb et al. | Mar. 27, 1945 |
| 2,422,538 | Framhein | June 17, 1947 |
| 2,439,599 | Framhein | Apr. 13, 1948 |
| 2,469,638 | Framhein | May 10, 1949 |
| 2,643,894 | Schroeder | June 30, 1953 |